United States Patent [19]

Pirlet

[11] 4,112,763

[45] Sep. 12, 1978

[54] INSPECTING THE INTERIOR OF AN ENCLOSURE

[75] Inventor: Robert Alfred Pirlet, Embourg, Belgium

[73] Assignee: Centre de Recherches Metallurgiques-Centrum Voor Research in de Metallurgie, Brussels, Belgium

[21] Appl. No.: 701,026

[22] Filed: Jun. 30, 1976

[30] Foreign Application Priority Data

Jul. 1, 1975 [BE] Belgium .................................. 830895

[51] Int. Cl.² .............................................. G01J 5/04
[52] U.S. Cl. ................................... 73/355 R; 350/61; 350/63
[58] Field of Search ....................... 73/324, 334, 343 B, 73/355 R, 355 EM, 421.5 A; 15/246; 350/61, 63; 356/43

[56] References Cited

U.S. PATENT DOCUMENTS

| 2,388,386 | 11/1945 | Cohen | 73/355 R X |
|---|---|---|---|
| 2,745,131 | 5/1956 | Auwärter | 350/61 X |
| 3,310,356 | 3/1967 | Borberg | 73/355 R X |
| 3,402,418 | 9/1968 | Le Roy | 73/324 X |
| 3,415,994 | 12/1968 | Fitti, Jr. | 73/355 R X |
| 3,436,965 | 4/1969 | Land | 73/355 R |
| 3,437,807 | 4/1969 | Moore | 73/355 R X |
| 3,475,859 | 11/1969 | Pirlet | 350/61 X |
| 3,609,236 | 9/1971 | Heilman | 350/63 X |

*Primary Examiner*—S. Clement Swisher
*Attorney, Agent, or Firm*—Holman & Stern

[57] ABSTRACT

A device for inspecting the interior of an enclosure comprises an instrument which receives radiation from the interior of the enclosure through an orifice at one end of the instrument. A screen located immediately in front of the instrument has an opening in register with the orifice. Compressed gas is passed between the instrument and the screen and escapes through the opening. The surface of the screen remote from the instrument is cleaned periodically or continuously, e.g. by scraping, at least around the opening.

7 Claims, 1 Drawing Figure

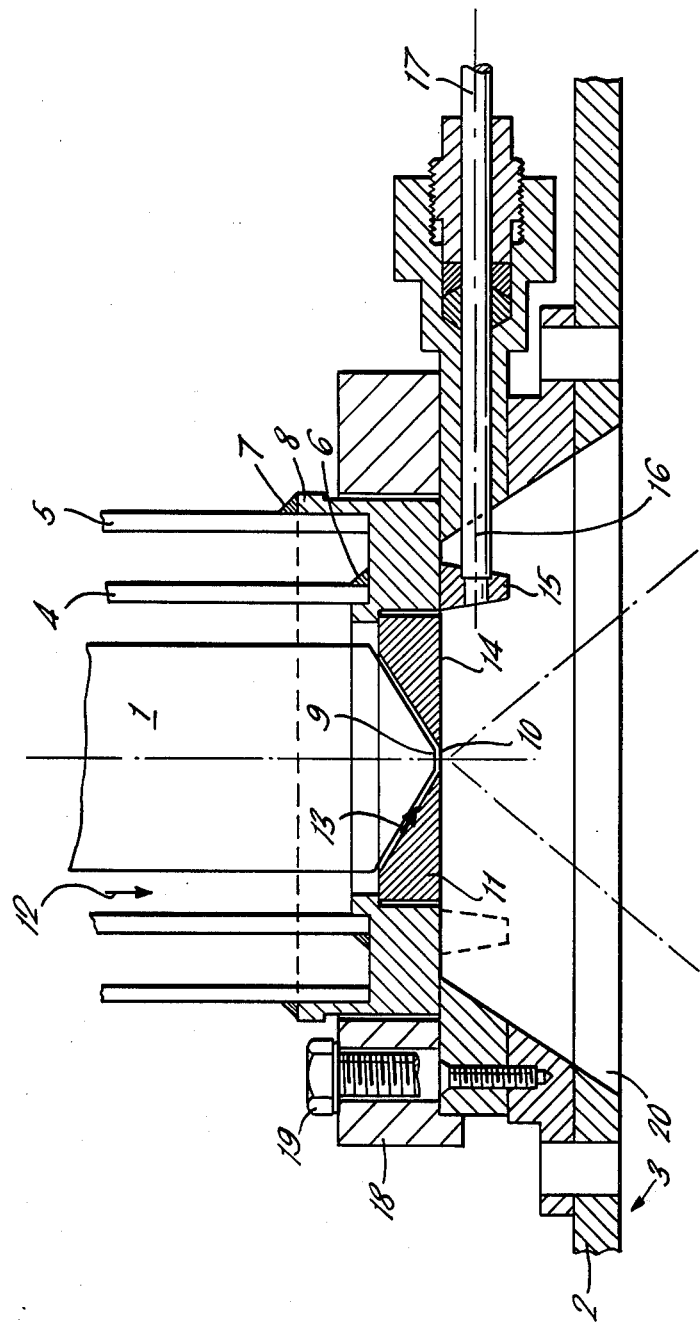

INSPECTING THE INTERIOR OF AN ENCLOSURE

BACKGROUND OF THE INVENTION

The present invention relates to a device for inspecting the interior of an enclosure, especially (but not solely) for inspecting material contained in the enclosure.

The following description illustrates an application of the device to the inspection of the upper surface of the burden in a blast furnace. This is done, however, by way of example and without implying any limitation of the applicability of the device. A device according to the invention can be used for observing the interior of any enclosure.

There is a well-recognized interest in observing what goes on in a blast furnace at the upper surface of the charge or burden, e.g. the evolution of the shape of this surface, the distribution of surface temperatures from its centre to its periphery, and the appearance of hot spots or cold zones. These indications allow the operation of the blast furnace to be improved, this depending on appropriate addition of coke, ore, and fluxes as well as on accurate distribution of these materials across the whole of the upper surface of the burden.

The value of all data is of course subordinate to the fact of being able to correctly observe the burden by means of a device which is as reliable as possible. This condition cannot easily be met, because the space above the burden in the blast furnace may contain a compressed gas (for example, at a pressure of 2 kg per $cm^2$) and is practically always very dusty.

In order to observe the charge inside a blast furnace, various devices have already been suggested which are generally of the type in which scanning occurs inside a practically fixed device, or of telemetric type. In most cases, these devices permit observation of the burden in a blast furnace through an inspection window of transparent material permanently cleaned from inside. The increase in back pressure inside blast furnaces has made the use of such inspection windows more risky. The inspection windows are difficult to clean satisfactorily by scraping. Moreover, it is difficult to ensure a jet of gas on the inner face of the inspection hole in order to clean it.

SUMMARY OF THE INVENTION

The present invention provides a device for inspecting the interior of an enclosure, comprising:
 (a) an observation or measuring instrument which terminates at its observation end with a very small orifice (preferably smaller than 10 mm) having a large angular aperture (preferably greater than 60°);
 (b) a screen located before and next to the instrument referred at (a) and formed with a very small opening (preferably smaller than 10 mm) facing the end opening of the instrument;
 (c) means for circulating a compressed gas in the space between the instrument and the screen and then through the opening formed in the screen;
 (d) means for periodically or continuously cleaning the surface of the screen remote from the instrument, at least at the part of the screen comprising the opening.

The above device according to the invention is applicable, for example, in the observation of what is going on in an enclosure, or in measuring the surface temperature of material contained in the enclosure. It is sufficient to sealingly fix the device to any aperture of suitable dimensions formed in the wall of the enclosure. The enclosure could be a blast furnace or any other kind of furnace. So far as the instrument is concerned, it could be a simple sighting instrument, or a television camera sensitive to visible radiation or infra-red radiation, or any other radiation-receiving instrument (e.g. a telemeter or a pyrometer) either scanning or not.

The device may further comprise means arranged to rotate the device about a point located close to the outlet orifice of the instrument. This variant allows the sighting axis of the instrument to be oriented at will in any directions; the whole device being, in this case, located in a sealed case. In particular, the screen may form part of a closed case containing the instrument, means being provided for turning the case in order to vary the direction from which radiation is received by the instrument.

BRIEF DESCRIPTION OF THE DRAWING

The invention will be described further, by way of example only, with reference to the accompanying drawing, whose sole FIGURE shows a longitudinal cross-section through the end of an observation device for inspecting the upper surface of the burden in a blast furnace.

DETAILED DESCRIPTION OF A PREFERRED EMBODIMENT

In the drawing, the end of an objective is referenced 1 and is cylindrical in shape. Also visible are the side wall 2 of the blast furnace and the interior 3 of the furnace. The objective 1 is surrounded by two coaxial cylindrical jackets 4 and 5 whose ends are welded at 6 and 7 to a ring plate 8. The end of the objective 1 has an orifice or pupil 9 (less than 10 mm in diameter) in register with a small opening 10 in the screen 11 fixed (by screwing) to the plate 8. The pupil 9 permits sighting within an angle of at least 40° (preferably at least 60°), which is also permitted by opening 10 (less than 10 mm in diameter).

The assembly is sealingly fixed to the side wall 2 by means of a conventional system including clamps 18 and bolts 9, around an aperture or bore 20 formed in the side wall 2.

A compressed-air supply (not shown) ensures that dry, oil-free air flows between the objective 1 and the jacket 4 in the direction of the arrow 12 and then flows in the direction of the arrow 13 in the restricted space between the objective 1 and the screen 11, before escaping through the opening 10, thereby sweeping out the opening 10 towards the interior of the furnace.

The inner faces of the ring 8 and the screen 11 are located in the same plane 14. A scraper 15, which is reciprocated by a rod 16 along the axis 17 of the rod, ensures cleaning of the surface of the screen 11 remote from the objective 1 about the opening 10. Thus the opening 10 and the area around it are regularly cleaned of undesirable material which tends to collect there.

I claim:
1. A device for inspecting the interior of an enclosure, comprising:
 (a) an instrument for receiving radiation from the interior of the enclosure, the radiation being received through an orifice at one end of the instrument;

(b) a screen located immediately in front of the instrument a portion of said screen defining a surface interior to said enclosure, the screen having an opening in register with the said orifice, of the instrument said screen and said instrument defining a restricted space therebetween;
(c) means for passing a compressed gas through the space between the instrument and the screen and then through the opening in the screen; and
(d) means for cleaning at least that part of said surface of the screen remote from the instrument which part contains the said opening.

2. A device as claimed in claim 1, in which the screen forms part of a closed case containing the instrument.

3. A device as claimed in claim 1, in which the transverse dimensions of the said orifice and the said opening are smaller than 10 mm.

4. A device as claimed in claim 1, in which said orifice for the reception of radiation has an angular aperture of at least 40°.

5. A device as claimed in claim 4, in which the said angular aperture is at least 60°.

6. A device as claimed in claim 1, in which the said cleaning means comprises a scraper.

7. A device as claimed in claim 1, in which the screen has a recess which receives said one end of said instrument, said recess and said one end converging towards the opening.

* * * * *